(12) United States Patent
Hale et al.

(10) Patent No.: US 7,279,806 B2
(45) Date of Patent: Oct. 9, 2007

(54) IGNITION SYSTEM WITH DRIVER IDENTIFICATION

(75) Inventors: Howard Stanley Hale, Canal Fulton, OH (US); Elaine Elizabeth Futrell, Clinton, OH (US)

(73) Assignee: Elaine E. Futrell, Clinton, OH (US)

( * ) Notice: Subject to any disclaimer, the term of this patent is extended or adjusted under 35 U.S.C. 154(b) by 0 days.

(21) Appl. No.: 11/191,185

(22) Filed: Jul. 27, 2005

(65) Prior Publication Data

US 2006/0036358 A1 Feb. 16, 2006

Related U.S. Application Data

(60) Provisional application No. 60/591,412, filed on Jul. 27, 2004.

(51) Int. Cl.
  B06R 25/04 (2006.01)
  G06K 9/00 (2006.01)
(52) U.S. Cl. .................. 307/10.4; 340/426.11; 340/5.53
(58) Field of Classification Search .............. 307/10.4; 340/430, 426.11, 5.53
  See application file for complete search history.

(56) References Cited

U.S. PATENT DOCUMENTS 5,705,976 A * 1/1998 Howard ............... 340/426.34
5,986,542 A * 11/1999 Hyde .................. 307/10.4
6,271,745 B1 * 8/2001 Anzai et al. ............ 340/5.53
6,891,467 B2 * 5/2005 Perttunen et al. ...... 340/426.17

* cited by examiner

Primary Examiner—Michael Sherry
(74) Attorney, Agent, or Firm—Alvin T. Rockhill

(57) ABSTRACT

System and method for positively identifying an operator through biometric means which shall prevent unauthorized or impaired operation of a motor vehicle by requiring the potential operator to sequentially energize several vehicle devices, within a set time period, prior to placing the vehicle ignition into a start position. The system includes a device for measuring an operator's biometric identification, and a microcontroller. Logic outputs from the sequencing mechanism and the timer mechanism are contained within the microcontroller operating as a logic decoder that is used to control the vehicle ignition circuit. The microcontroller monitors the sequence in which the vehicle's devices are energized, and if they are energized within the correct order and within the predetermined amount of time then the microcontroller will output a signal to allow the ignition circuit to close. A sensory indicator may alert the potential operator as to the condition of the microcontroller output. An unauthorized user is inhibited from operating the motor vehicle because their identification could not be biometrically established and/or the performance sequence is unknown to him/her. Slower reflex times or impaired motor skills may also prevent an impaired operator from performing the proper sequence within the predetermined time period.

8 Claims, 7 Drawing Sheets

IGNITION SYSTEM WITH DRIVER IDENTIFICATION

This application claims the benefit of a Provisional Patent Application No. 60/591,412 filed Jul. 27, 2004 entitled: IGNITION SYSTEM WITH DRIVER IDENTIFICATION. This application also claims the benefit of Non-Provisional U.S. Pat. No. 6,920,389 issued Jul. 19, 2005 entitled IGNITION SYSTEM issued to all of the same inventors as is listed in this application.

BACKGROUND OF THE INVENTION

1. Field of the Invention

The present invention relates to systems for biometrically identifying a potential operator through thumbprint, fingerprint, iris, voice recognition or other biometric means of identifying an individual for the purpose of inhibiting potential impaired operators and unauthorized persons from operating a motor vehicle. Additionally, the present invention relates to other systems, devices, and methods for inhibiting potential impaired operators and unauthorized persons from operating a motor vehicle. Furthermore, the invention provides systems, devices, and methods for inhibiting potential operators who may be impaired, for example by drug use or alcohol consumption or sleep deprivation, from operating a motor vehicle.

2. Description of the Related Art

Various systems and devices have been developed to prevent unauthorized use of a vehicle. Additionally, systems and devices have been developed to inhibit operation of a motorized vehicle by a driver impaired particularly through consumption of excessive alcohol, legal or illegal drugs and/or sleep deprivation.

For example, U.S. Pat. No. 4,723,625 discloses a sobriety-testing device that tests the reflexes of a potential operator before permitting the engine of the motor vehicle to be started. Purportedly, the engine is disabled if the operator's reflexes are substantially below a previously determined norm. The disclosed sobriety-testing device includes a hand-held unit having a base position button, as well as left and right test buttons.

U.S. Pat. No. 5,465,079 discloses a method and apparatus for evaluating a driver's performance under actual real-time driving conditions. The disclosed method and apparatus compares information gathered by a radar system and other sensors with driver-related information previously stored in an event recording device.

U.S. Pat. No. 5,798,695 discloses an impaired operator detection and warning system. Purportedly, the system characterizes operator control actions as a complex sine wave and uses a power spectrum array analysis to predict the level of operator alertness in real-time.

U.S. Pat. No 6,501,370 discloses a vehicle anti-theft lock apparatus and method including a code box that must be accessed to enable the vehicle to operate. The apparatus purportedly locks the steering column, the gearshift lever, and the front and rear brakes. Further, the apparatus purportedly disables the vehicle electrical system.

3. Objects and Advantages

None of these references provide a simple system to positively/biometrically identify a potential operator and/or deter unauthorized/impaired use of a motor vehicle that utilizes input from the vehicle's functional devices.

The present invention provides a simple, but effective, system for determining who is attempting to start a motor vehicle. It also provides a simple, yet effective system to inhibit unauthorized or impaired operation of a motor vehicle; yet one which is simple for an authorized, unimpaired operator to engage.

It is therefore an object of the invention to provide a system, engaged with a vehicle electrical system, which requires a potential operator to first biometrically identify themselves, then perform a plurality of vehicle functions, in a predetermined sequence, before the vehicle ignition can be engaged. The predetermined sequence of vehicle functions must further be performed within a specified time period, or the vehicle ignition will not engage.

It is a further object of the invention to provide a method for engaging the ignition of a vehicle. This method includes the step of providing a system, engaged with the vehicle electrical system, which requires a potential operator to identify themselves through their thumbprint, fingerprint, iris, voice or some other form of biometric recognition, and then perform a plurality of vehicle functions in a predetermined sequence, within a specified time period.

It is a further object of the invention to provide electronic circuitry, engaged with a vehicle electrical system, wherein the electronic circuitry interrupts the vehicle start relay signal to prevent engagement of a vehicle ignition unless the operator is biometrically identified, and a plurality of vehicle functions are performed in a predetermined sequence within a specified time period.

One advantage of the present invention is the inhibition of operation of a motor vehicle by an unauthorized user. The system acts as a theft deterrent because it would be difficult for an unauthorized user to start the vehicle due to lack of biometric identifying factors, and without knowing the proper functions and the proper sequence.

Another advantage of the present invention is the inhibition of operation of a motor vehicle by potential operators whose motor skills are diminished due to excessive alcohol consumption, or drug use, or sleep deprivation, or any other factor that would render them impaired such as the onset of dementia. If the timing function "maxes out" before the proper sequence is performed, the vehicle ignition system is prevented from engaging. Thus, although a sober operator can readily perform the proper sequence, an impaired operator with slower reaction time would have difficulty in providing a valid performance.

Another advantage of the present invention is that the inventive system may be adapted to be retrofit on existing vehicles.

Another advantage of the present invention is that the inventive system may be adapted to a variety of motor vehicles, not merely automobiles. For example, the inventive system may be used in connection with boats, airplanes, and mass transit systems.

Another advantage of the present invention is that the inventive system may be incorporated as original equipment in new vehicles.

Another advantage of the present invention is that the inventive system may be utilized by law enforcement/court agencies as part of driver restriction/monitoring programs.

Still other advantages of the present invention will be readily appreciated by those having skill in the art.

SUMMARY OF THE INVENTION

The present invention is directed to a system and device that operates not only as an anti-theft device, but also as an ignition interlock system to inhibit operation of a motorized vehicle by a driver impaired by use of alcohol or drugs or sleep deprivation utilizing biometric means to positively identify the potential operator and correctly set the allowable timer period for which the particular individual had to successfully complete the sequence.

The disclosed system requires a potential operator to be initially identified to the system through either thumbprint, fingerprint, iris, voice or other form of biometric recognition, then energize a series of vehicle function devices in sequence and within a specified amount of time. If the potential operator fails, the car will not start. Generally, the vehicle function devices include devices that are engaged with the vehicle's electrical system.

For example, the vehicle function devices can include turn signals (right and/or left), parking lights, headlights; glove compartment light, make-up mirror light, emergency flashers, horn, brake pedal light, seat belt use indicator, etc. Essentially any feature engaged with a vehicle's electrical system that is readily accessible by a potential operator could be utilized.

A potential operator must cause the pre-selected vehicle function devices to be energized, for example, by turning on a turn signal, tapping the brake, flipping open a mirror, etc. The inventive system interrupts the electrical circuit from the vehicle electrical source or battery to each of the pre-selected vehicle function devices. Output signals generated from the devices, when energized, are utilized as function inputs to the inventive system. The pre-selected vehicle function devices, the number of devices chosen, the required sequence of operation and the time allotted for performance are all parameters which can be altered within the scope of the present invention.

Thus, in accordance with one embodiment of the invention, there is provided a system operable to interrupt the circuits that connect a plurality of vehicle function devices with vehicle energy source or battery. Further, the system is operable to interrupt the vehicle ignition circuit. In order for the vehicle ignition circuit to be completed, and therefore allow the vehicle ignition to engage when placed in the "start" position, a potential operator must biometrically identify his/her self, energize each of the plurality of vehicle function devices, in a predetermined sequence, within a predetermined time period.

The exemplary system includes a reset mechanism operable to initialize a plurality of system mechanisms. The system further includes a microcontroller operable to receive logic inputs from each of a plurality of vehicle function devices when the vehicle function device is energized. The microcontroller being operable to enable the vehicle ignition system only if each of the plurality of vehicle function devices are energized according to a predetermined sequence within an allowable time period.

The system includes a microcontroller that performs the functions previously described as the timing mechanism operable to selectively provide a timing output in a predetermined "go" logic condition for a predetermined time period.

The system includes a microcontroller that performs the functions previously described as the gate mechanism operable to selectively generate an ignition output responsive to each of the generated function outputs and the timing output. The ignition output is in a predetermined logic "go" condition only if each of the plurality of function outputs and the timing output are in the predetermined logic "go" condition.

The inventive system may include a delay mechanism to delay an electrical signal from the vehicle's electrical source or battery. It has been found that use of a delay mechanism inhibits noise from adjacent wires from inadvertently providing an undesired outcome.

The inventive system may also include sensory indicator means, such as a plurality of LEDs to provide a potential operator with information regarding the condition of the system.

The inventive system is comprised of a microcontroller that performs the functions previously described as a sequencing mechanism that utilizes a "daisy-chain" configuration of J-K flip-flops. If the vehicle function devices are energized according to the predetermined sequence, then the output channels will all be in a predetermined logic condition, herein defined as a "go" condition.

The logic outputs associated with the vehicle function devices are sent to the microcontroller. Additionally, the microcontroller serves as a timer mechanism. The timer mechanism may also be of the type known in the art that utilizes the relationship between a resistor and a capacitor to provide a completed circuit for a pre-selected period of time.

The gate mechanism is preferably an output from a microcontroller, or a discreet logic device such as a NAND gate. If the individual performs the plurality of vehicle functions in the correct predetermined sequence within the allowable time period, then the output signal from the microcontroller will be in a predetermined logic condition, known as the logic "go" condition which is operable to selectively control the vehicle ignition start-relay.

The microcontroller is further operable to selectively control the sensory indicator means to indicate the status of the gate mechanism. If the output from the gate mechanism is in a logic "no-go" condition, herein defined as the logic condition opposed to the "go" condition, a first, preferably red, LED is illuminated to indicate to a potential operator that the vehicle ignition cannot be engaged. If the output from the gate mechanism is in a logic "go" condition, a second, preferably green, LED is illuminated to indicate to a potential operator that the vehicle ignition may be engaged. Additionally a microcontroller can independently control the state of the sensory indicator to provide contextual feedback to the operator.

The present invention is also directed to a method of inhibiting an unauthorized potential operator from causing a vehicle ignition circuit to close. The method includes the step of providing a system in electrical communication with a biometric identification system, a plurality of vehicle function devices and a vehicle ignition circuit. The system is operable to prevent the vehicle ignition circuit from closing unless a potential operator causes each of the plurality of vehicle function devices to be energized, in a predetermined sequence, within a predetermined time period after being biometrically identified.

REFERENCE NUMBERS 10-system
14-buffer filter or mechanism
18-reset mechanism
22-delay mechanism
34-microcontroller
46-sensory indicator mechanism
80-inhibit sub-circuit
84-jumper connection
110-identifier mechanism
J3/P3-connectors at the interface of the vehicle function devices with the system
J2/P2-connectors at the interface of the vehicle ignition circuit and the system

DETAILED DESCRIPTION

Operation of the Invention

Figure 1:
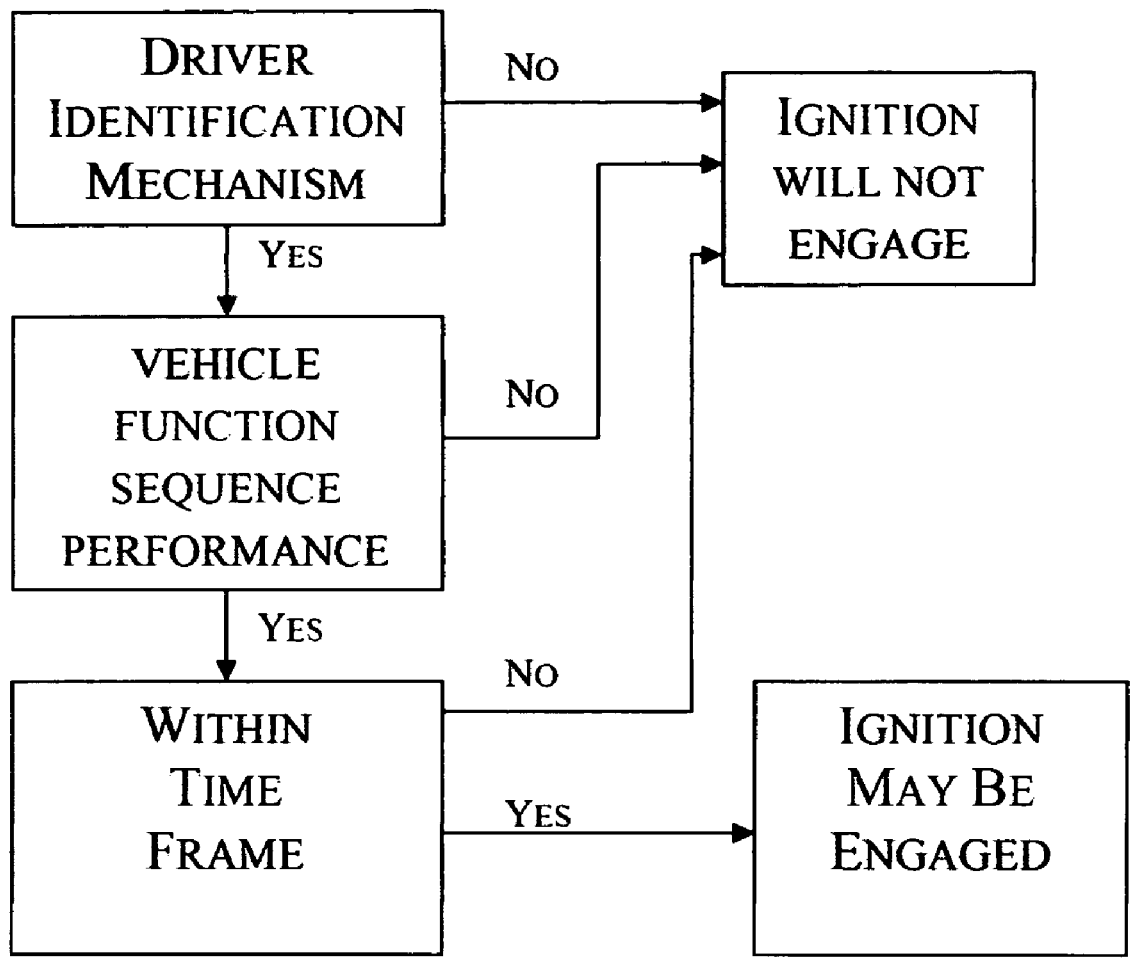
FIG. 1 shows a flow chart of a system according to the present invention.
Figure 2:
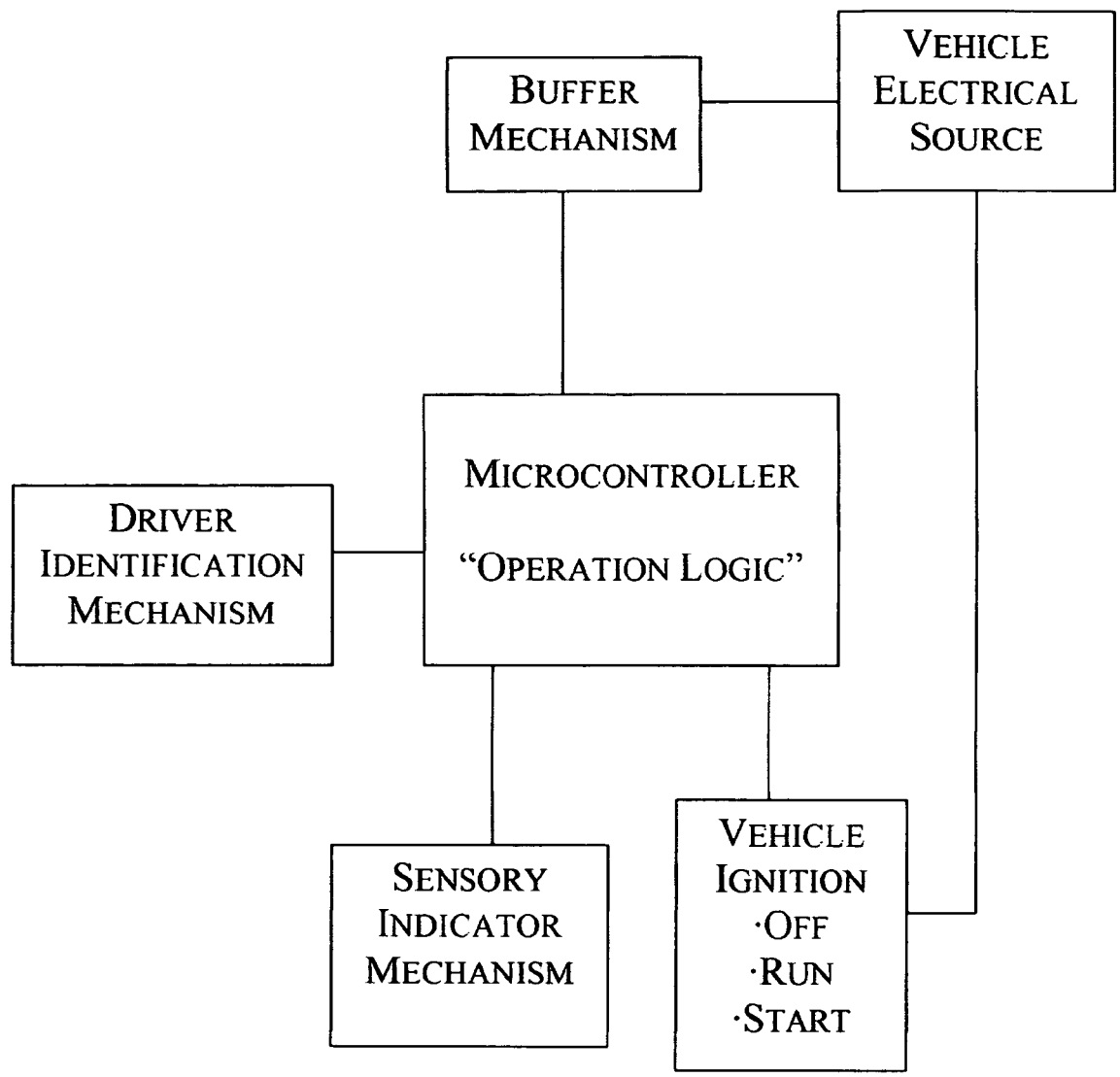
FIG. 2 shows a simplified block drawing of the mechanisms of the present invention.
Figure 3A:
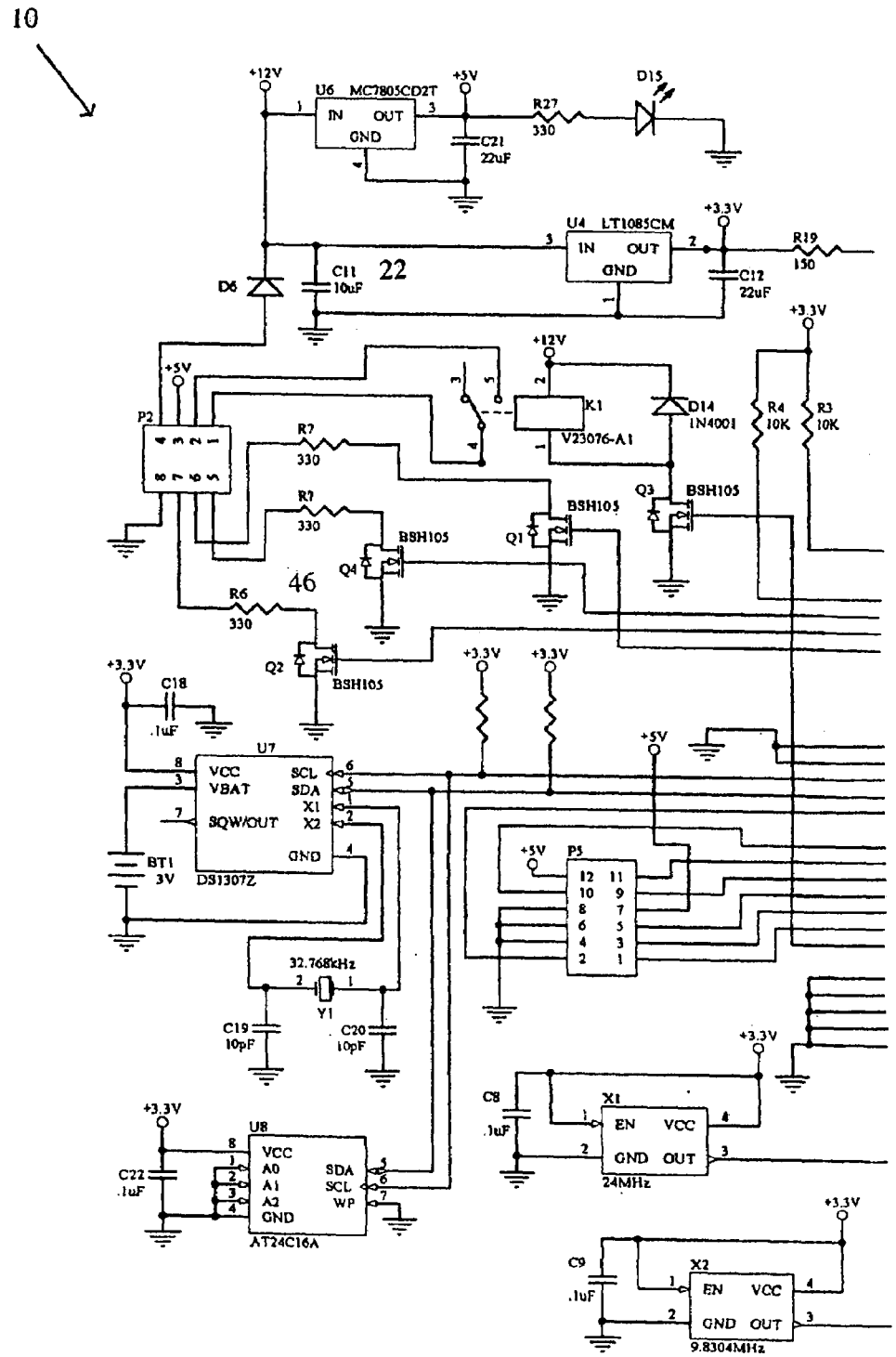
FIG. 3 shows a schematic diagram of an ignition system according to the present invention.
Figure 3B:
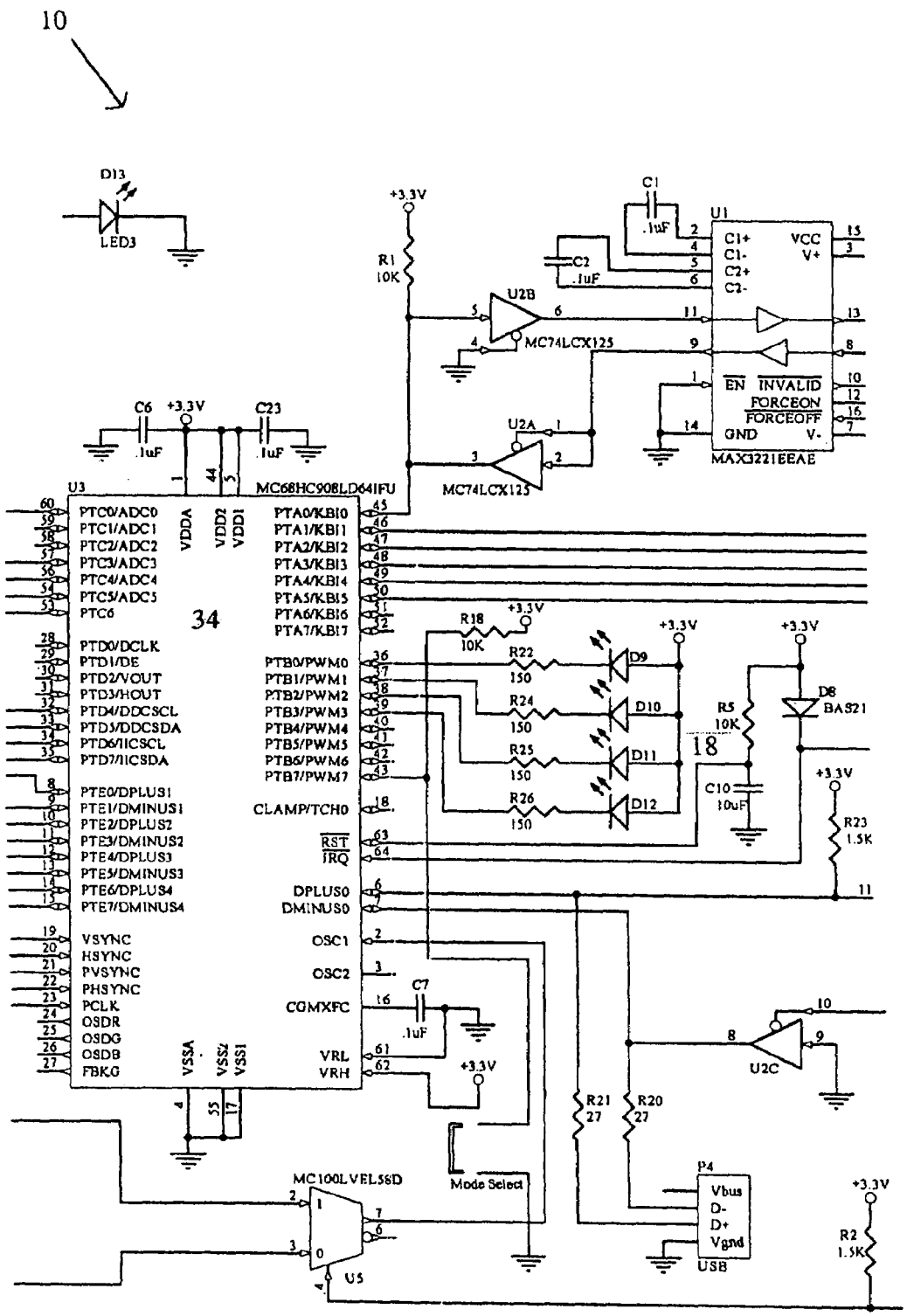
Figure 3C:
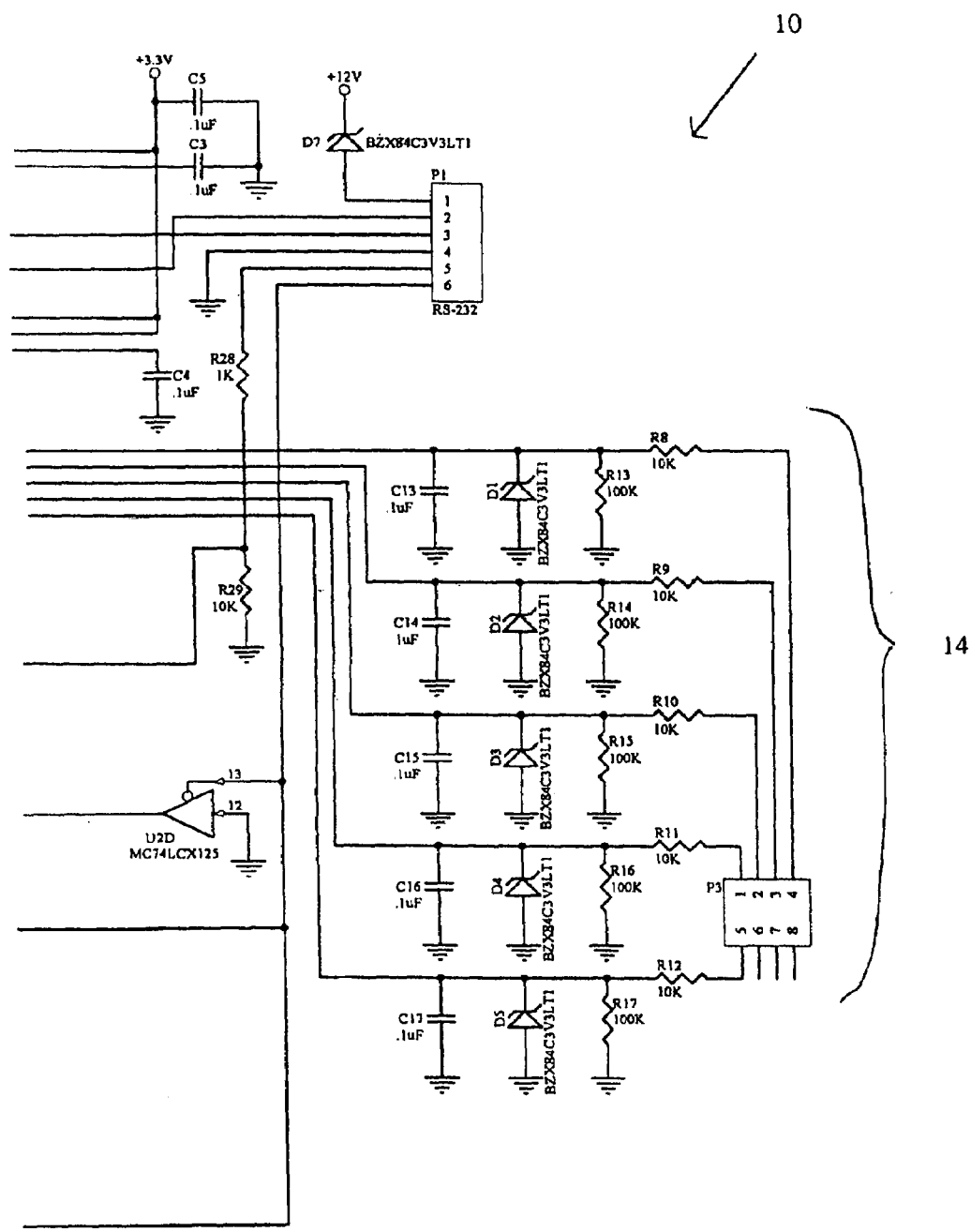

With reference to the accompanying drawings, FIG. 3 a schematic representation of system 10 is provided. In a preferred embodiment, the system 10 includes a buffer filter or buffer mechanism 14 generally operable to convert an initial vehicle voltage, i.e. 12 volts, into a voltage useable by the system 10, i.e. 3.3 volts. A reset mechanism 18 operates to reset or initialize the system mechanisms. The preferred system 10 further includes a delay mechanism 22. In the preferred embodiment, delay mechanism 22 generally operates as an anti-noise interrupt mechanism. Delay mechanism 22 delays the electrical signal from the vehicle electrical source, or battery, when the vehicle ignition is placed in a run/start position.

System 10 includes a microcontroller 34 which performs the sequencing function generally operable to receive inputs from a plurality of pre-selected vehicle function devices as will be explained in further detail below. In a preferred embodiment, all decoder logic and gate functions will be preformed by microcontroller 34.

In a preferred embodiment, system 10 further includes a sensory indicator mechanism 46 operable to provide a potential vehicle operator with sensory information about a condition of system 10. In the preferred embodiment, the sensory indicator mechanism 46 includes first LED and second LED, preferably operable to emit different colors. First LED is preferably operable to illuminate when system 10 is ready to receive input from a potential operator, after the vehicle ignition is placed in the "run/start" position. More preferably, first LED illuminates after operation of the delay mechanism 22. Second LED is preferably operable to illuminate when the vehicle ignition system is in an operable condition.

In an exemplary system, both first and second LED's are lit simultaneously to emit yellow light to indicate that system 10 is ready to receive input from biometric identification system 110, then once the operator has been identified, first LED emits a red light, to indicate that system 10 is ready to receive input from the pre-selected vehicle function devices and the timer output is in the logic "go" condition. In the exemplary system, second LED emits green light, to indicate that the vehicle ignition may be engaged if placed in the "start" position.

System 10 is adapted to interface with a vehicle electrical system, particularly the ignition circuit, via connectors J2, P2. System 10 is further adapted to interface with a plurality of vehicle function devices via connectors J3, P3. In the preferred embodiment, the system 10 is energized when the vehicle ignition is placed in the run/start position.

With reference to FIG. 3, when the key is in the ignition, a potential operator must turn the ignition key to the Run/Start position. The input on J2-4 is the 12V power from the vehicle energy source or battery when the ignition switch is in a Run/Start position. As illustrated by a sub-circuit, designated generally by 22, block U4 converts the +12V down to a useable voltage (i.e. +3.3V) to be utilized by the logic mounted on the unit's circuit board. Relay K1 is controlled by transistor Q3. In turn, the relay contact closes when K1 is energized causing a completed circuit to the vehicle start relay. System 10 is thus operable to selectively control relay K1.

Figure 4:
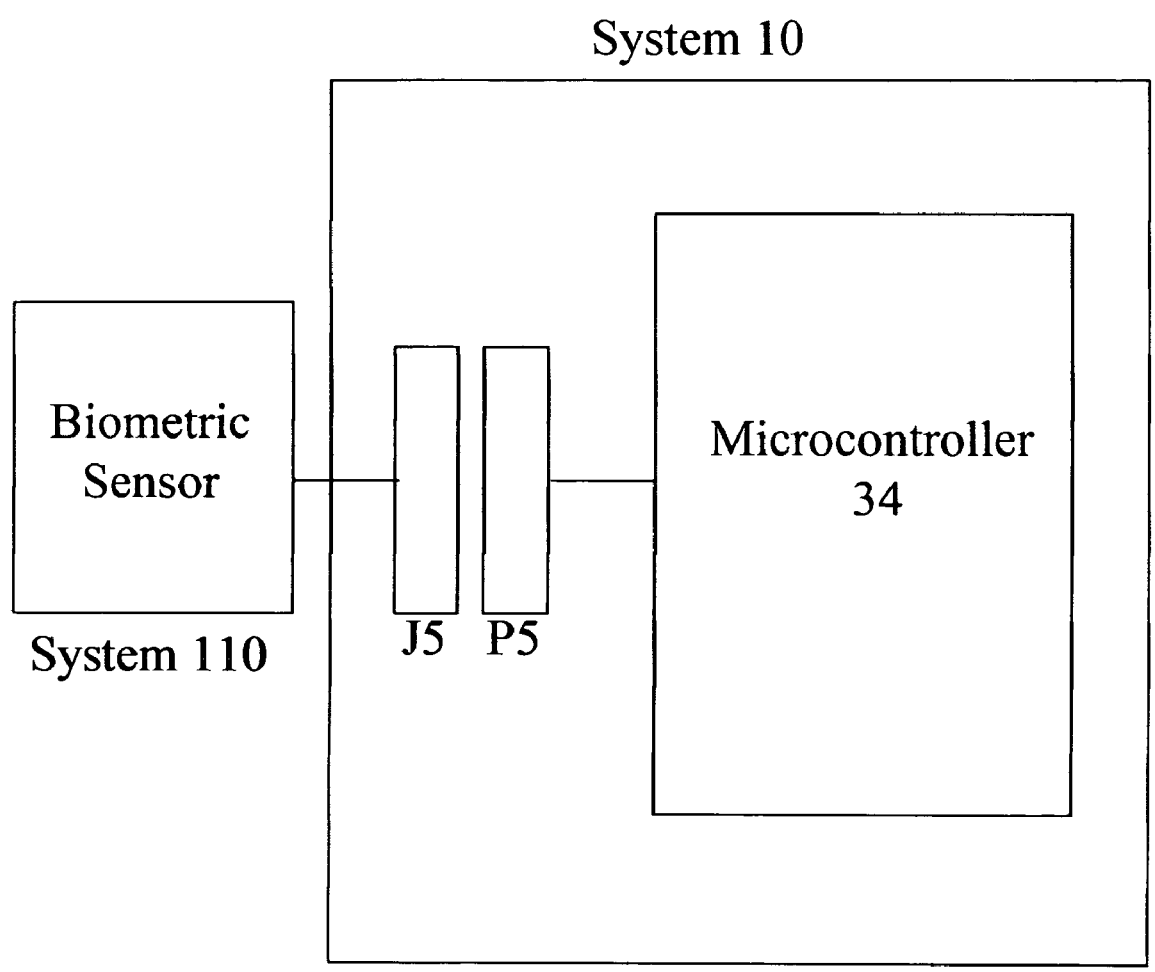
FIG. 4 shows a block diagram of the invention having a biometric identifier mechanism.

With reference to FIG. 4, system 110 is adapted to interface with system 10 to biometrically identify the operator. System 110 is designed to biometrically identify the operator through fingerprint, thumbprint, iris, voice or any other form of biometric recognition. If the operator is not able to be biometrically identified by system 110 the vehicle is inhibited from starting.

In this exemplary embodiment, system 10 is also adapted to interface with five (5) pre-selected vehicle function devices. Each vehicle function device is operable to be engaged, directly or indirectly, with the vehicle's electrical system. For example, the vehicle function devices discussed in connection with this exemplary embodiment include left turn signal (LT); foot brake light (FB); parking light (PL); right turn signal (RT); back up light (BL). It is contemplated within the scope of the present invention to select a greater or lesser number of vehicle function devices. Generally, any vehicle function device that is engaged with the vehicle electrical system, and readily accessible to a potential operator, can be selected. It is within the scope of the present invention to select other vehicle function devices such as the light in a glove compartment, a seatbelt mechanism, a make-up mirror light, emergency flashers, and the like.

In the preferred embodiment, each pre-selected vehicle function device, when acted upon by a potential operator, and thereby energized by the vehicle electrical system, provides input to buffer mechanism 14. Buffer mechanism 14 converts the input signals to a lower amplitude and filters out unwanted noise. The signals are then sent to microcontroller 34.

As illustrated, in a preferred embodiment, microcontroller 34 controls the logic outputs. If the proper vehicle function devices have been energized, in a proper sequential order, then microcontroller 34 is operable to generate associated logic outputs that are in a predetermined logic "go" condition, herein defined as logic "1". If the potential operator fails to perform the proper sequence when energizing the vehicle function devices, then the logic outputs will not be in the logic "1" or "go" condition, and the vehicle ignition cannot be engaged. In a preferred embodiment, the logic outputs are memorized or held when a vehicle function device is energized. If an improper sequence is performed, system 10 must be reset before output from microcontroller 34 can be changed.

In the preferred embodiment, not only must the vehicle operator be biometrically identified and the selected vehicle function devices be energized in the predetermined sequence, but the sequence must be performed within a predetermined time period as well. Thus, an impaired potential operator, who knows the proper sequence, may be inhibited from starting the motor vehicle due to the presence of timer mechanism within microcontroller 34. A potential operator, whose motor skills are diminished due to excessive alcohol consumption, or drug use, or lack of sleep, or onset of dementia may not be able to properly perform the function sequence within the predetermined time period. System 10 is designed so that all vehicle inputs must be asserted in the correct sequence during the time period that the timer from microcontroller 34 is in a "go" condition, or the vehicle ignition cannot be engaged from the "start" position. A logic "1" output from microcontroller 34 is herein defined as the logic "go" condition.

In an initial power-up time (i.e. 10 milliseconds), the microcontroller 34, component U3, is in the reset mode, due to the R-C time period caused by resistor R5 and capacitor C10.

After capacitor C10 reaches +3V, the input to microcontroller, at U3-63, goes from a logic "0" to a logic "1".

After the operator as has been identified, the time frame for the operator to complete the sequence of vehicle inputs is controlled by microcontroller 34. The timing is calculated by microcontroller 34 using the average time of the last five successful starts by that individuals. The averaging of the time starts after the individual has successfully started the vehicle 20 times. Before the vehicle has been started 20 times, the operator has a maximum of 20 seconds in which to start the vehicle.

When the predetermined time period is exceeded, microcontroller 34 goes to a logic "no-go", or "0" condition. In the preferred embodiment, the output from microcontroller 34 cannot be changed then until system 10 is reset.

If the timer mechanism times out before the potential operator performs the proper vehicle functions in sequence, then the microcontroller will inhibit the relay control output U3-15 from enabling the vehicle ignition. However, if the proper sequence is performed before the timer mechanism times out, then the microcontroller 34 will not inhibit the relay control output U3-15. Other outputs from microcontroller U3-53 and U3-54 control the sensory indicator mechanism comprising, in this example, first LED and second LED. Before an operator has been biometrically identified, the microcontroller 34 illuminates both the first LED and the second LED resulting in yellow being illuminated. When the output from microcontroller 34 is in a logic "no-go" or "1" condition, the first LED is illuminated. When the output from microcontroller 34 is in the "go" or "0" condition, the second LED is illuminated. Also, the output from microcontroller 34 controls the signal that eventually passes to relay K1 via transistor Q3.

In the proto-type vehicle, the LEDs, are mounted on the vehicle instrument panel for ready sensory indication to a potential vehicle operator. However, it is within the scope of the present invention to provide other sensory devices, such as audio tones, to alert the potential operator as to a condition of system 10 and/or system 110.

In a preferred embodiment, a system reset occurs automatically each time the potential operator turns the ignition key back to OFF position and then to run/start position. In the preferred embodiment, once the output from microcontroller is in the logic "go" condition, it remains in that condition until the system is reset. Thus, if the vehicle stalls, the ignition can be re-engaged, so long as the operator does not move the ignition key back to OFF position.

Table 1 below provides a parts list for all the discrete components mounted on the exemplary electronic printed circuit board. Exemplary mathematical values are given for all resistors and capacitors. Exemplary identities are given for the transistors, diodes, zener diodes, and IC chips. It will be appreciated by those having skill in the art that such components may be replaced with alternate components without departing from the scope of the present invention.

TABLE 1

| Manufacturer | Part Number | Description |
| --- | --- | --- |
| CITIZE | CFS308-32.768KDZP8 | CLOCK 32.768 KHZ CRYSTAL |
| ONSEMI | BZX84C3V3LT1 | DIODE |
| AMP | 770970-1 | 8 POS CONNECTOR |
| SAMTEC | FLE-106-01-G-DV-A | 12 PIN CONNECTOR |
| MAXIM | MAX3221EEAE | IC |
| ONSEMI | MC100LVEL58D | IC |
| KOA | RM73B2ET270J | RES 27 OHM 5% 1/4 W |
| DIGIKEY | ECS-P73-A-ND | CLOCK 9.8304 MHZ |
| POT & B | V23076-A3001-C132 | RELAY |
| ANADEV | ADG3232BRJ | IC |
| 3M | 3759-14 | CABLE 14 COND FLAT RIBBON |
| THO&B | 171-16 | CABLE 16 COND RIBBON |
| 3M | 929834-01-36 | HEADER |
| SAMTEC | SSW-136-01-GS | SOCKET |
| CONCOR | 799-2004 | BATTERY HOLDER |
| RAY-O | BR2325 | POWER SUPPLY LITH BATT |
| PHILIP | 06032R104K7B20 | CAP .1 UF 16 V 10% X7R |
| ECS | ECS-3953C-240-TR | CLOCK CRYSTAL |
| MOTORO | MC7805ACD2T | REGULATOR 5 V |
| KOA | RM73B2ET151J | RES 150 OHM 5% 1/4 W |
| KOA | RK73B2ELTD331J | RES 330 OHM 5% 1/4 W |
| TEXINS | CD74HC125M | IC |
| ECS | ECS-.327-12.5-17 | CRYSTAL 32.768 KHZ |
| MOTORO | MTD20P06HDL | MOSFET |
| KEMET | T491A226M010AS | CAP 22 UF 10 V 20% TANT |
| MOTORO | BAS21LT1 | DIODE |
| KEMET | C1206C100J1GAC | CAP 10 PF 100 V 5% |
| CAL-CH | RM06F1241CT | RES 1.24K 1% 1/16 W |
| CAL-CH | RM06J103CT | RES 10K 5% 1/16 W |
| DALE | CRCW0603104JT | RES 100K 5% 1/16 W |
| DALSEM | DS1338Z-33 | IC |
| ATMEL | AT24C16AN-10SI-2.7 | IC |
| FAIRCH | RC1587M | REGULATOR 3.3 V |
| VISHAY | S12304DS | TRANSISTOR |
| DIGIKEY | ECS-P73-A-ND | CLOCK 24.000 MHZ |
| KEMET | T491B106K016AS | CAP 10 UF 16 V 10% TANT |
| FREECE | MC68HC908LD64IFU | IC |
| PANASO | LN1351C | LED GREEN |
| VISHAY | CRCW06031002F | RES 10K 1% 1/16 W |
| KEMET | C1206C104K5RAC | CAP .1 UF 50 V 10% X7R |
| EDMAR | 1N4001 | DIODE 1 A 50 V |
| MILMAX | 896-30-004-90-000000 | USB TYPE A CONN |

Description and Operation of Alternate Embodiments

We have replaced timer mechanism 38 previously described in Provisional Patent 60/591412 and Non-Provisional U.S. Pat. No. 6,920,389 with a microcontroller. It was within the scope of that invention to replace timer mechanism 38 with other timing devices or sub-circuits. Such replacements are well known by those of skill in the art. For example, a clock chip, such as a 1 Hz clock chip (LM555) feeding a four bit binary up counter (7493) could be used with a comparator (7485). Such a proposed replacement can provide several time settings from which to choose In yet another embodiment, the proposed system utilizes a microprocessor chip to transfer data into a memory register. One function of the memory register can be to store and hold a given operator's last time (for example up to the last five times) of performing the required sequence of functions. Generally, an operator decreases the time necessary to perform the required sequence of functions with experience. Thus, using the microprocessor chip, the MAX TIME for the given operator can be updated automatically.

An embodiment utilizing the microprocessor chip can be utilized to gather/store/compare several operator qualities. Various embodiments of the invention are envisioned using microprocessor technology. Thus a wide range of operator data can be tracked and evaluated. For example, it is possible via biometric identification to provide for a plurality of authorized operators, each having a distinct performance norm. Further, tracking of vehicle movement, time of day, comparison of the time of day with difficulty operating the vehicle, etc. are within the scope of the present invention. Such operator data can be stored and/or downloaded to another computer via connection ports for a variety of uses. For example, if the disclosed system were used as part of a law enforcement program, compliance with a court order could be readily monitored.

Another embodiment of the present inventive system may utilize fewer or more than five vehicle function devices for input to the microcontroller 34. Those having skill in the art could readily adapt the microcontroller 34 to provide this modification.

Figure 5:
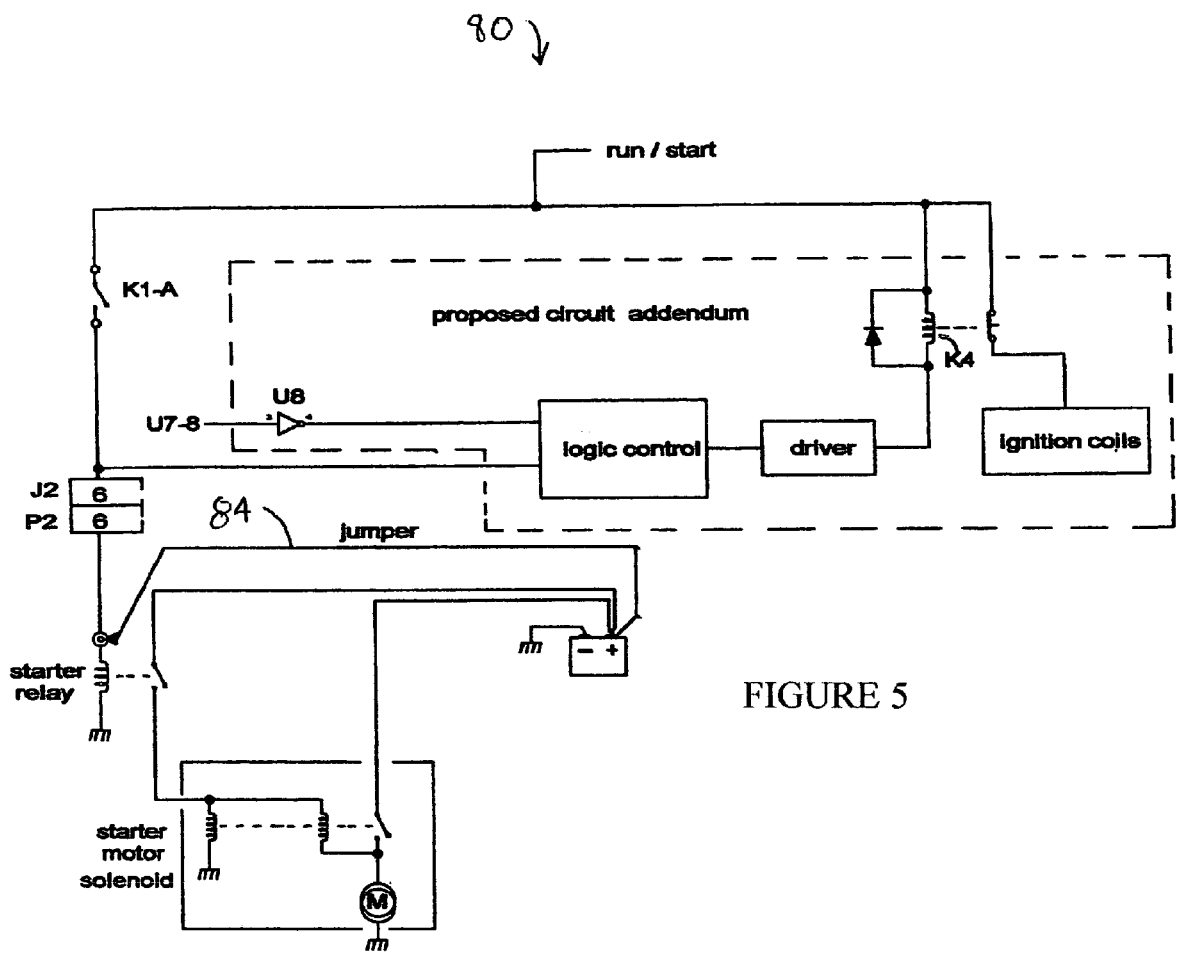
FIG. 5 shows a block diagram of an alternate embodiment of the invention having a jump inhibiting sub-circuit.

Another embodiment of the invention, illustrated in FIG. 5, provides an inhibit sub-circuit, shown generally at 80. The inhibit sub-circuit 80 is operable to prevent the system from being by-passed by jump-starting the engine. If an attempt is made to by-pass the system by the jumper connection 84, then coil K4 will break the ignition circuit. Thus the engine will turn when the ignition is in the run-start position, but the ignition will not engage.

Another embodiment of the invention is that it provides a timed shutdown. In this embodiment, if a potential operator attempts to start the motor vehicle, but is unable to do so after a predetermined number of attempts, microcontroller 34 will effectively delay the system reset until a predetermined time period expires. In this preferred embodiment, the time period is four hours. Those with skill in the art can readily adapt this embodiment to provide a greater or lesser time period.

Another embodiment of the invention is that it provides a method to inhibit the starting of the vehicle after a preprogrammed number of days unless the data stored in microcontroller 34 has been downloaded to a computer and the timer within microcontroller 34 has been reset. This can be used to verify that certain actions or reporting has been completed by the vehicle operator.

Yet another embodiment of the invention is illustrated in FIG. 4. This embodiment includes identifier mechanism shown generally at 110 to identify an operator using a biometric identifier such as a thumbprint. If the operator is recognized by the system, the operator may proceed to perform the vehicle function device sequence within the predetermined time period in order to engage the vehicle ignition.

Yet another embodiment of the invention is to provide a system that can be coded by a vehicle owner to allow additional authorized operators through biometric identification. The system can be pre-coded so that a user cannot change the parameters in order to subvert the impaired driver deterrence.

The invention claimed is:

1. A system for biometrically identifying a potential motorized vehicle operator for use with vehicle having a vehicle ignition circuit and a plurality of vehicle function devices comprising: a device that biometrically recognizes an individual for identification purposes; and, a sequencing mechanism within a microcontroller that is operable to receive logic inputs from each of a plurality of vehicle function devices when the vehicle function device is energized, the microcontroller being operable to generate a predetermined "go" logic condition only if each of the plurality of vehicle function devices are energized according to a predetermined sequence; and, a timing mechanism within a microcontroller that is operable to selectively provide a timing output in a predetermined "go" logic condition for a predetermined time period; and, a gate mechanism within a microcontroller that is operable to generate an ignition output responsive to each of the generated function outputs and the timing output, wherein the ignition output is in a predetermined logic "go" condition only if each of the plurality of function outputs and the timing output are in the predetermined logic "go" condition, wherein the ignition output is operable to selectively complete the vehicle ignition circuit when the ignition output is in the logic "go" condition; and, a delay mechanism in electrical communication with the vehicle ignition, the delay mechanism being operable to cause a predetermined delay in an electrical signal generated when the vehicle ignition is placed in a "run/start" position; and, a buffer mechanism in electrical communication with a vehicle electrical source, the buffer mechanism being operable to convert an initial voltage of the vehicle electrical source to a predetermined voltage useable by the system; and, a reset mechanism operable to initialize a plurality of system mechanisms, wherein the reset mechanism is operable to respond to the electrical signal generated when the vehicle ignition in a "run/start" position.

2. The system of claim 1 further comprising: an indicator mechanism in electrical communication with the microcontroller, the indicator mechanism being operable to selectively provide sensory output to indicate a condition of the ignition output; and, wherein the indicator mechanism comprises a first LED and a second LED, and wherein the first LED is operable to emit light if the logic output from the microcontroller is not in the predetermined logic "go" condition and the second LED is operable to emit light if the logic output from the microcontroller is in the predetermined logic "go" condition, and wherein both the first LED and the second LED can emit light simultaneously to indicate that biometric identification is required; and, wherein the sequencing mechanism is operable to receive logic inputs from at least two vehicle function devices; and, wherein the gate mechanism is comprised of a microcontroller; and, wherein the predetermined "go" logic condition of the function outputs is logic "1".

3. The system of claim 1 wherein the sequencing mechanism previously comprised a plurality of J-K flip-flops connected in a daisy-chain configuration is now comprised of a microcontroller that connects to the input buffers.

4. The system of claim 1 wherein the device that biometrically recognizes an individual identifies the individual by thumbprint.

5. The system of claim 1 wherein the device that biometrically recognizes an individual identifies the individual by fingerprint.

6. The system of claim 1 wherein the device that biometrically recognizes an individual identifies the individual by iris.

7. The system of claim 1 wherein the device that biometrically recognizes an individual identifies the individual by voice.

8. A method of inhibiting an unauthorized potential operator from causing a vehicle ignition circuit to close, the method comprising the steps of: providing a system to biometrically recognize an individual and then providing a system in electrical communication with a plurality of vehicle function devices and a vehicle ignition circuit, the system being operable to prevent the vehicle ignition circuit from closing unless a potential operator causes each of the plurality of vehicle function devices to be energized, in a predetermined sequence, within a predetermined time period, wherein the time period is controlled by a microcontroller based upon the average of previous successful starts by the individual.

* * * * *